(12) United States Patent
Miyashita (10) Patent No.: US 6,867,826 B2
(45) Date of Patent: Mar. 15, 2005

(54) LIGHTING PANEL FOR A DISPLAY (75) Inventor: Junji Miyashita, Yamanashi-ken (JP)

(73) Assignee: Citizen Electronics Co., Ltd., Yamanashi-ken (JP)

( * ) Notice: Subject to any disclaimer, the term of this patent is extended or adjusted under 35 U.S.C. 154(b) by 139 days.

(21) Appl. No.: 10/396,458

(22) Filed: Mar. 26, 2003

(65) Prior Publication Data
US 2003/0184691 A1 Oct. 2, 2003

(30) Foreign Application Priority Data
Mar. 28, 2002 (JP) ........................................ 2002-093383

(51) Int. Cl.⁷ .......................................... G02F 1/1335
(52) U.S. Cl. ............................ 349/61; 349/65; 362/31
(58) Field of Search ............................ 349/61–63, 65; 362/31

(56) References Cited

U.S. PATENT DOCUMENTS 5,712,694 A * 1/1998 Taira et al. .................... 349/9

* cited by examiner

Primary Examiner—Tarifur R. Chowdhury
Assistant Examiner—Richard H Kim
(74) Attorney, Agent, or Firm—Dennison, Schultz, Dougherty & MacDonald (57) ABSTRACT A panel for lighting a display has a lighting panel made of a transparent plastic and having a rectangular shape in plan view. The lighting panel has a reflection surface and a discharge surface on opposite long sides and an incident surface on a short side of the lighting panel. A plurality of scalene prisms are formed on the reflection surface of the lighting panel. A flat plane is formed on the reflection surface, adjacent the incident surface. An equilateral prism is formed on the flat plane.

4 Claims, 11 Drawing Sheets

LIGHTING PANEL FOR A DISPLAY

BACKGROUND OF THE INVENTION

The present invention relates to a lighting panel for a display such as liquid crystal display (LCD) for illuminating the display from the underside thereof as a back light.

Figure 10:
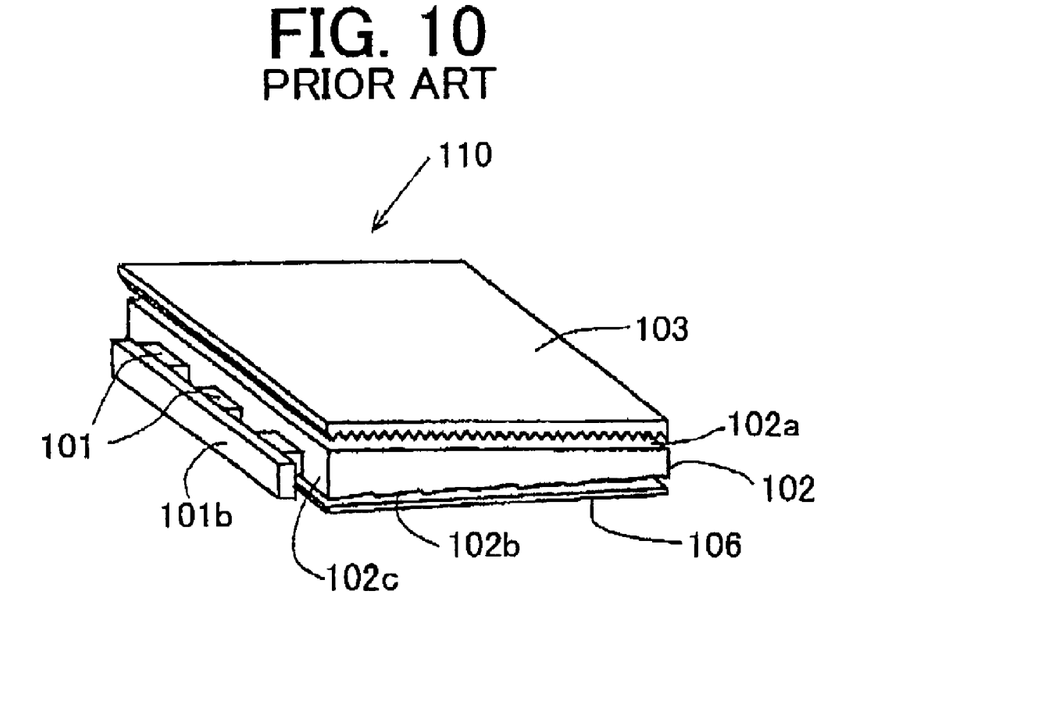
FIG. 10 is a perspective view showing a conventional lighting device.
Figure 11:
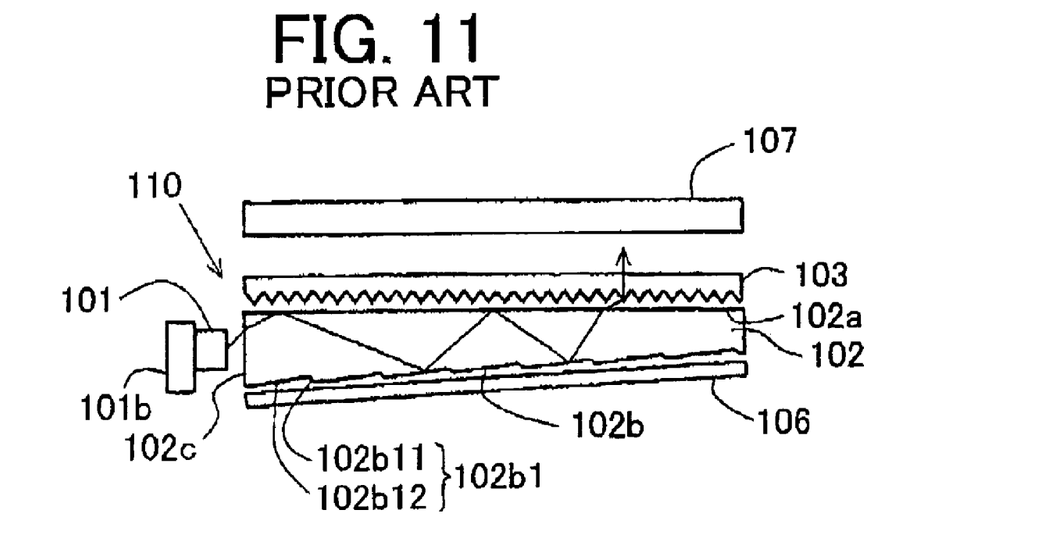
FIG. 11 is a side view of the conventional lighting device.

FIG. 10 is a perspective view showing a conventional lighting device, and FIG. 11 is a side view of the device.

A lighting panel 102 made of a transparent plastic has a rectangular shape in plan view and has a discharge surface 102a, a reflection surface 102b and an incident surface 102c. Three edge lights 101 of an LED are mounted on a supporting plate 101b corresponding to the incident surface 102c. On the reflection surface 102b, a plurality of prisms 102b1 are formed as reflector members. Each prism 102b1 comprise a first inclination side 102b11 opposite to the incident surface 102c and a second inclination side 102b12 opposite to the first side.

The light emitted from the edge light 101 enters the lighting panel 102. The light in the lighting panel 102 is reflected by the prisms 102b and discharged from the discharge surface 102a. The discharged light enters a prism sheet 103 and discharges from the prism sheet to be applied to an LCD 107.

Light discharged from the underside of the lighting panel 102 is reflected by a reflector sheet 106 to be returned to the lighting panel 102.

Figure 12:
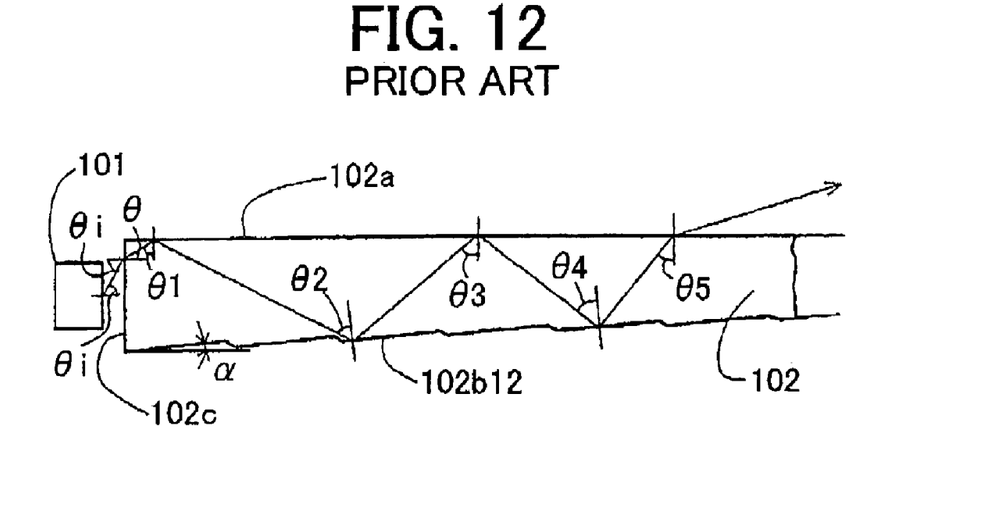
FIG. 12 is a side view of a lighting panel.

Referring to FIG. 12, light emitted from the edge light 101 enters the lighting panel 102 at an incident angle $\theta i$, and the light proceeds in the panel 102 in a direction of $\theta$ in accordance with the Snell's law. There are following relationships between angle $\theta i$ and angle $\theta$.

$$\theta = \sin^{-1}((1/n)\sin \theta i) \quad (1)$$

where n is the refractive index of the panel, and the refractive index of air is 1.

For example, if the refraction index n of the lighting panel 102 is n=1.58 and $\theta i=90°$, $$\theta = \sin^{-1}(1/1.58) = 39.3°$$

Therefore, the critical angle $\theta c$ is $$\theta c = 39.3°$$

The incident light is reflected by the discharge surface 102a at a reflection angle $\theta 1$ which is larger than 50°. The reflected light strikes the second inclination side 102b12 having an inclination angle $\alpha$ at angle $\theta 2=\theta 1-\alpha$, where $\alpha$ is between 1 degree and several degrees. The light is reflected by the second side 102b12 at the angle of $\theta 2$ and strikes the discharge side 102a at an incident angle $\theta 3$, $\theta 3=\theta 2-\alpha=\theta 1-2\alpha$. The light is reflected by the surface 102a at the reflection angle $\theta 3$, and strikes the second side 102b12 at an incident angle $\theta 4=\theta 3-\alpha=\theta 1-3\alpha$.

Thus, the incident angle $\theta 1$ reduces $\alpha$ by $\alpha$ at every incidence. Namely in the case of N incidence times, the incident angle $\theta N$ is $$\theta N = \theta 1 - N\alpha \quad (2)$$

When the incident angle $\theta N$ becomes smaller than the critical angle $\theta c$ as follows $$\theta N = \theta 1 - N\alpha < \theta c \quad (3)$$

The light discharges from the discharge surface 102a at an incident angle $\theta 5$. Consequently, the number of discharge light from an area near the incident surface 102c is small.

Furthermore, there is following described troubles in the conventional lighting panel.

Figure 13:
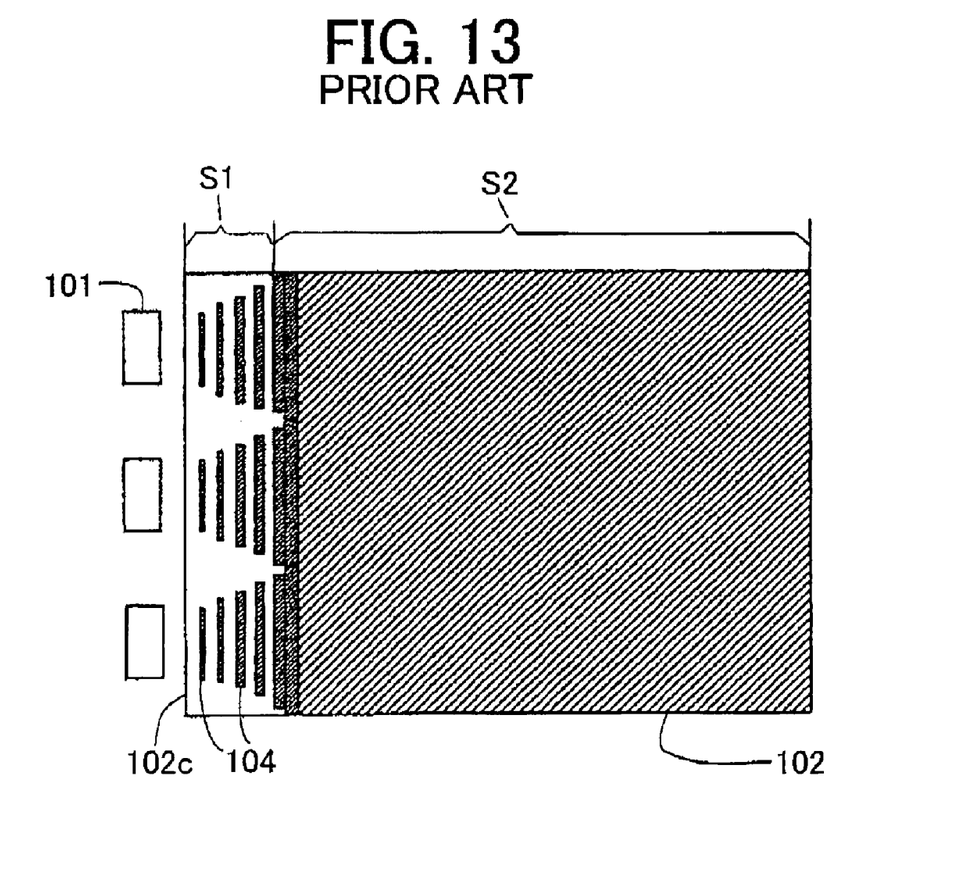
FIG. 13 is a plan view of the device.

Referring to FIG. 13, there appears bright lines 104 in a range S1 near the incident surface 102c. In a range S2, lights are uniformly and thickly discharged, hence there is no bright lines. The reason for the generating of the bright lines will be described hereinafter.

Figure 14:
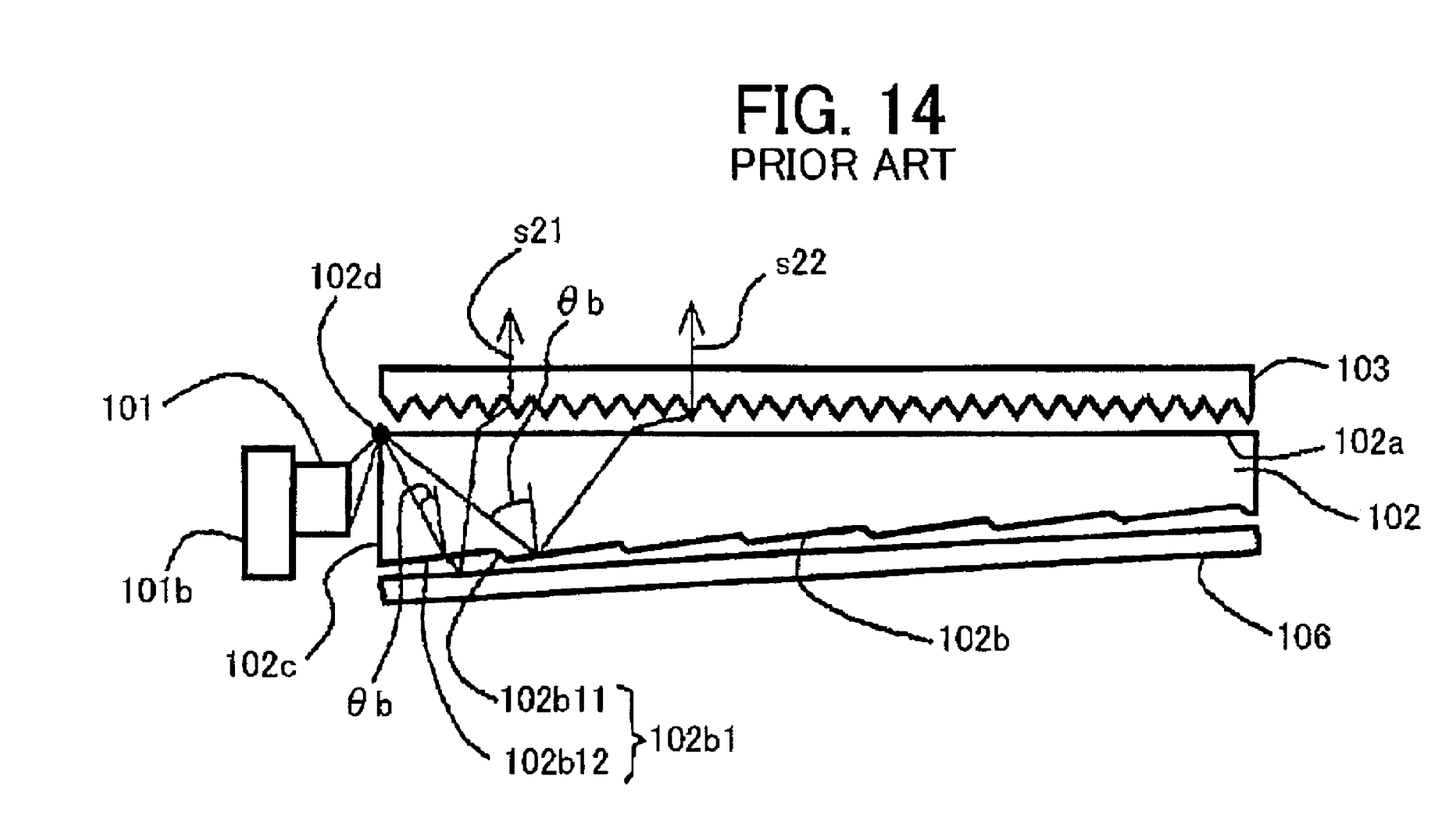
FIG. 14 is a side view of the device.

Referring to FIG. 14, lights from the LED 101 striking a corner 102d of the incident surface 102c enter in the lighting panel 102 from the corner 102d. The lights are diffused in the lighting panel. Light s21 of an incident angle $\theta b$ smaller than the critical angle $\theta c$ transmits the second inclination side 102b12 and is reflected by the reflector sheet 106 and enters again in the lighting panel 102. The light s21 transmits the lighting panel 102 and the prism sheet 103. Light s22 of an incident angle $\theta b$ larger than the critical angle $\theta c$ is reflected by the second inclination side 102b12 and transmits the lighting panel 102 and prism sheet 103.

The number of incidences is determined before discharge of light by the difference between the incident angle $\theta b$ and the critical angle $\theta c$ as described above. The number increases with the difference.

Figure 15:
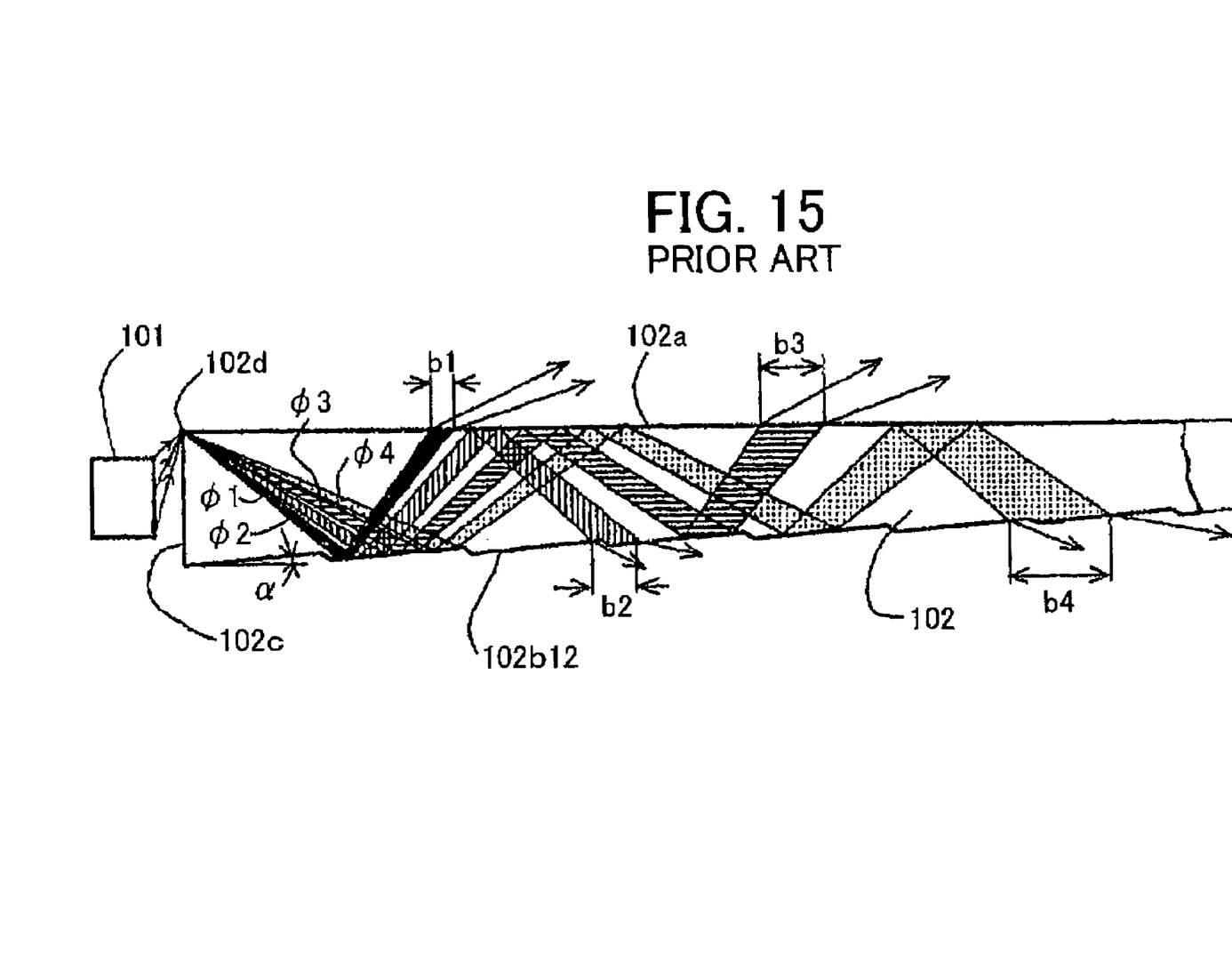
FIG. 15 is a side view of a conventional lighting panel.

Referring to FIG. 15, $\phi 1$, $\phi 2$, $\phi 3$, $\phi 4$ are from the corner 102d. Each of incident rays of light angles $\theta d1$, $\theta d2$, $\theta d3$ and $\theta d4$ of rays $\phi 1$, $\phi 2$, $\phi 3$ and $\phi 4$ is smaller than the inclination angle $\alpha$ of the second inclination side 102b12. The relationship between the angles $\theta d1$, $\theta d2$, $\theta d3$, $\theta d4$ and the critical angle $\theta c$ are as follows.

$$\theta d1 = 1.5\alpha + \theta c$$

$$\theta d2 = 2.5\alpha + \theta c$$

$$\theta d3 = 3.5\alpha + \theta c$$

$$\theta d4 = 4.5\alpha + \theta c \quad (4)$$

As shown in FIG. 15, the incident angles of the first incidence to the second inclination side 102b12 are as follows.

$$\theta d1-\alpha, \theta d2-\alpha, \theta d3-\alpha, \theta d4-\alpha$$

These angles are larger than the critical angle $\theta c$ as understood from the formula (4). Consequently, all of the rays are reflected.

As the second incidence to the discharge surface 102a, incident angles are as follows.

$$\theta d1-2\alpha<\theta c, \theta d2-2\alpha>\theta c, \theta d3-2\alpha>\theta c, \theta d4-\alpha>\theta c$$

Only the rays $\phi 1$, the incident angle of which is smaller than the critical angle $\theta c$, discharges from the discharge surface 102a at a width b1 of rays.

The reflection and discharge at third and fourth incidences are as shown in FIG. 15.

Widths of the rays increase with length of each ray in the lighting panel 102 as b1<b2<b3<b4, as shown in FIG. 15. Thus, the bright lines 104 generate as shown in FIG. 13. Such bright lines decrease the lighting effect for the LCD.

SUMMARY OF THE INVENTION

An object of the present invention is to provide a lighting panel which may prevent the generation of bright lines.

According to the present invention, there is provided a panel for lighting a display comprising a lighting panel made of a transparent plastic and having a rectangular shape in plan view, the lighting panel having a reflection surface and a discharge surface on opposite long sides, and an incident surface on a short side of the lighting panel, an edge light provided corresponding to the incident surface, a plurality of scalene prisms formed on the reflection surface of the lighting panel, a flat plane formed on the reflection surface in a range between the incident surface and a group of the scalene prisms, and at least one first equilateral prism formed on the flat plane.

At least one second equilateral prism is formed on the discharge surface adjacent the incident surface.

Each of the first and second equilateral prisms is formed into a form projected inside the panel.

These and other objects and features of the present invention will become more apparent from the following detailed description with reference to the accompanying drawings.

DETAILED DESCRIPTION OF THE PREFERRED EMBODIMENT

Figure 1:
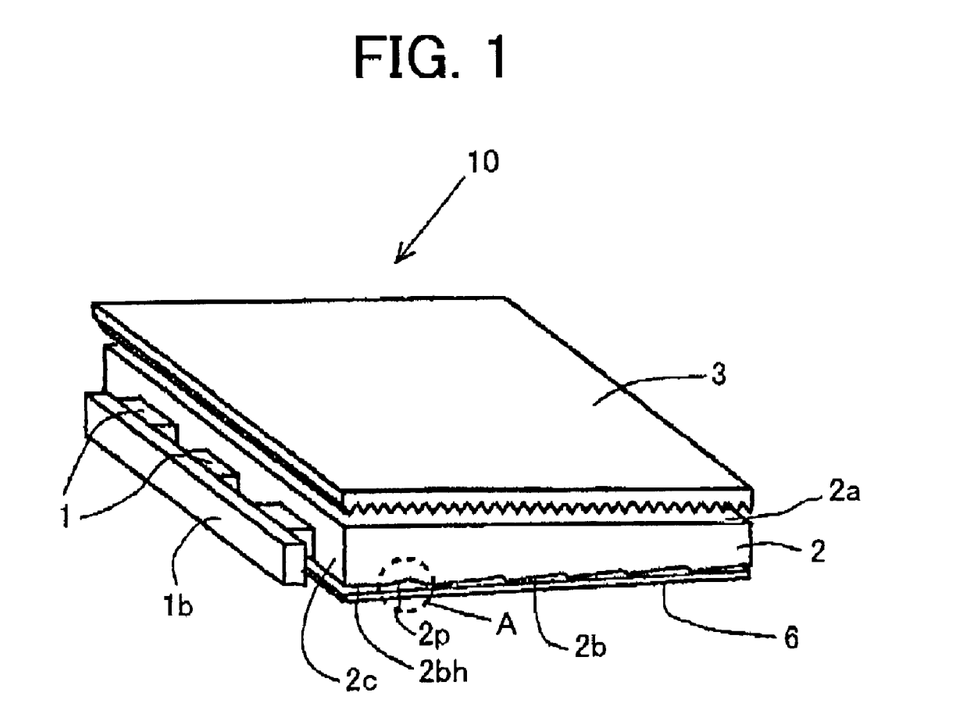
FIG. 1 is a perspective view showing a 1 lighting device according to a first embodiment of the present invention.
Figure 2:
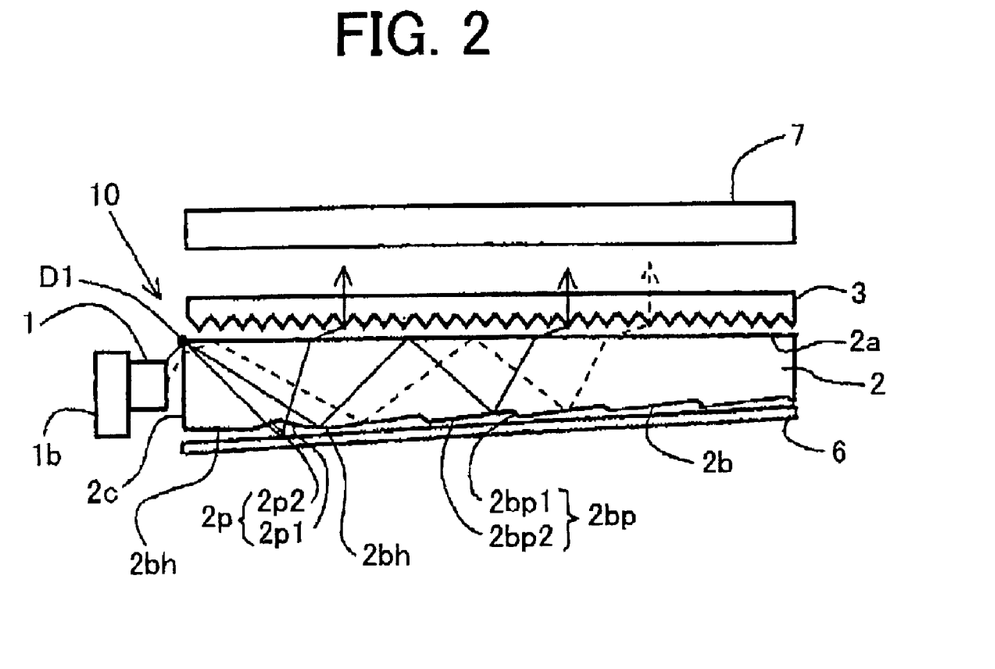
FIG. 2 is a side view of the device.
Figure 3:
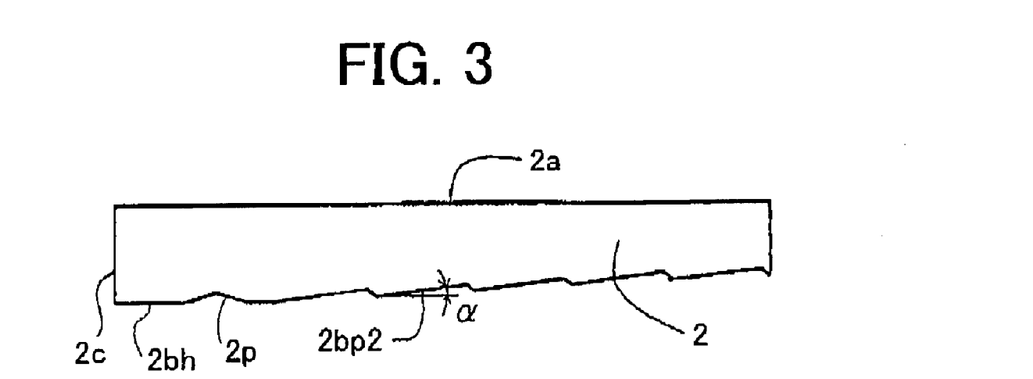
FIG. 3 is a side view of a lighting panel.

FIG. 1 is a perspective view showing a lighting device according to a first embodiment of the present invention, FIG. 2 is a side view of the device, and FIG. 3 is a side view of a lighting panel.

A lighting panel 2 made of a transparent plastic has a rectangular shape in plan view and has a discharge surface 2a, a reflection surface 2b and an incident surface 2c. Three edge lights 1 of LEDs are mounted on a supporting plate 1b corresponding to the incident surface 2c. On the reflection surface 2b, a plurality scalene prisms 2bp are formed as reflector members. Each prism 2bp comprises a first inclination side 2bp1 opposite to the incident surface 2c and a second inclination side 2bp2 opposite to the first side. The inclination angle α of the second inclination side 2bp2 is between 1 degree and several degrees.

In accordance with the present invention, a flat plane 2bh parallel to the discharge surface 2a is formed on the reflection surface 2b in a range adjacent to the incident surface 2c.

On the flat plane 2bh, an equilateral prism 2p is formed. Each of prisms 2bp and 2p extends in the lateral direction of the lighting panel 2.

Figures 4A, 4B:
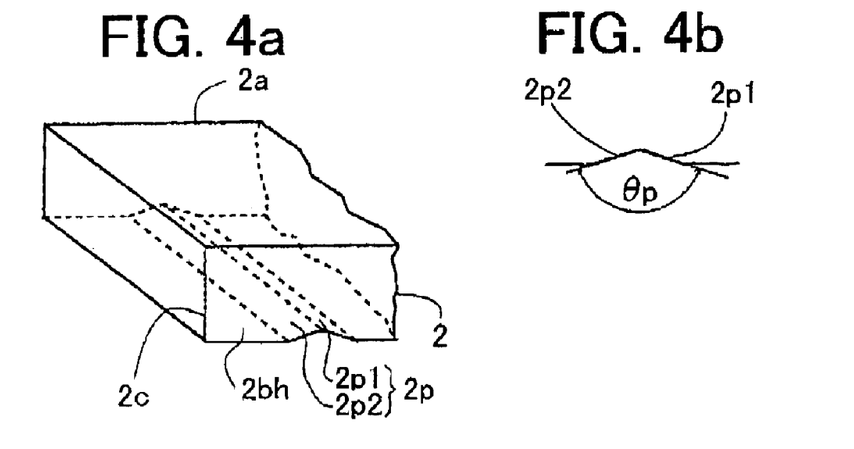
FIG. 4a is an enlarged perspective view of a part A in FIG. 1.
FIG. 4b is a side view of an equilateral prism.
Figure 4C:
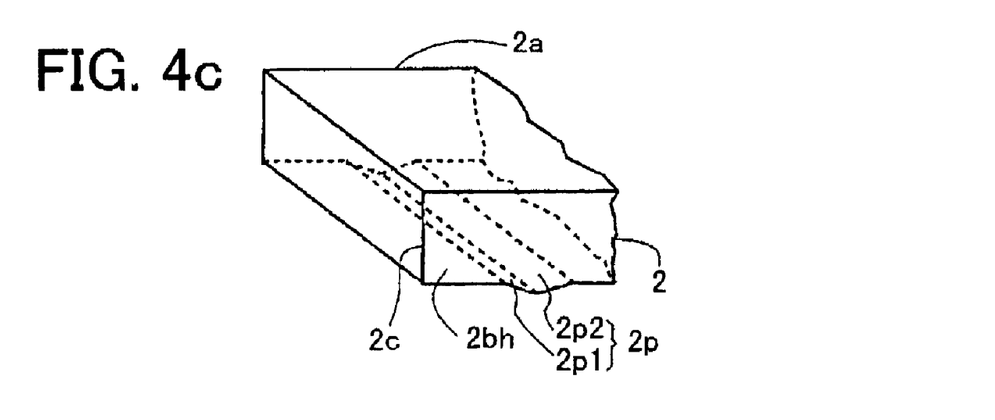
FIGS. 4c to 4e are perspective views showing other examples of the prism.

FIG. 4a is an enlarged perspective view of a part A in FIG. 1, and FIG. 4b is a side view of the equilateral prism 2p. As shown in FIG. 4b, the equilateral prism 2p comprises a first inclination side 2p1 opposite to the incident surface 2c and a second inclination side 2p2 opposite to the first inclination side 2p1, and the vertical angle θp is larger than 130°. In the case that the thickness of the lighting panel 2 at the flat plane 2bh is about 1 mm, it is desirable to provide the equilateral prism 2p at a position in a range between 3 mm and 4 mm from the incident surface 2c.

The light emitted from the edge light 1 enters the lighting panel at the incident surface 2c. The light of a dotted line in the lighting panel 2 shown in FIG. 2 is repeatedly reflected by the prisms 2bp and discharged from the discharge surface 2a. The discharged light enters a prism sheet 3 and discharges from the prism sheet to be applied to an LCD 7.

Figure 5:
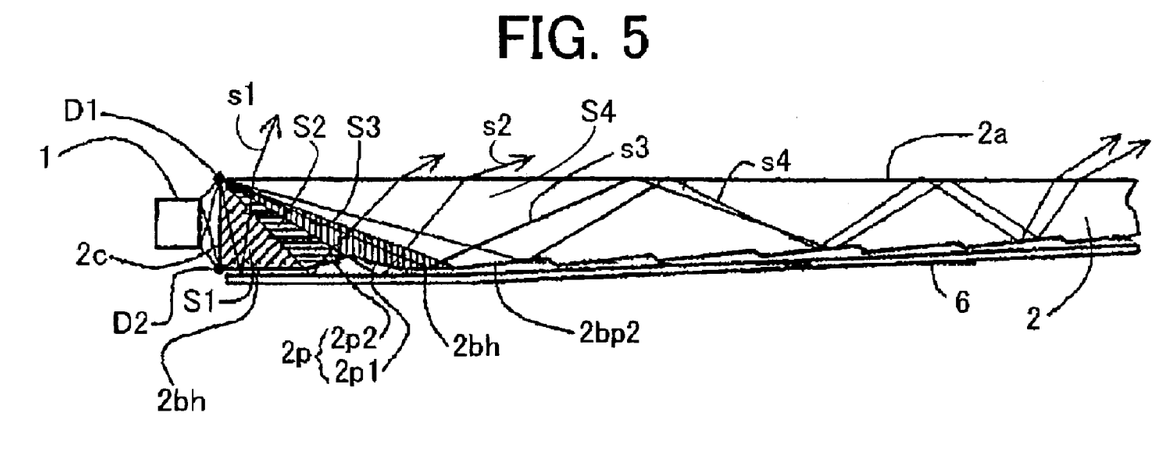
FIG. 5 is an enlarged side view of the lighting panel.

As shown in FIG. 5, there is an upper corner D1 and a lower corner D2 of the incident surface 2c.

The lighting panel 2 is divided into four areas S1, S2, S3 and S4 for light rays from the upper corner D1. The area S1 is an area between the incident surface 2c and the prism 2p. In the area S1, the incident angle of the incident light to the flat plane 2bh is smaller than the critical angle. Therefore, the light passes through the reflection surface 2b, and is reflected by a reflection sheet 6 to be returned. The returned light passes through the lighting panel 2 and discharges from the discharge surface 2a as light s1.

In the area S2 which corresponds to the second inclination side 2p2, the incident angle of the incident light is smaller than the critical angle. Therefore, the light passes through the lighting panel 2, and is reflected by the reflection sheet 6, and discharges as light s2. Since a plurality of light rays are continuously discharged, there does not appear bright lines in an area corresponding to the areas S1 and S2.

In the area S3 corresponding to the first inclination side 2p1 and the flat plane 2bh on the right side of the prism 2p, the incident angle of the light to the first inclination side 2p1 is very large. Therefore, the reflected light discharges from the right end surface of the lighting panel 2 without discharging from the discharge surface 2a, so that bright lines do not generate.

The incident angle of light s3 to flat plane 2bh is very large so that the incident angle is considerably larger than the critical angle. Thus, the reflection is repeated large number of times (for example 20 times) before the discharging of the light.

In the area S4, the light s4 is reflected on the second inclination side 2bp2 because of a more larger incident angle. The reflection is also repeated. As described above, the width of the discharged rays increases with the length of rays in the lighting panel 2. A large width of the discharged rays reduces the quantity of light in the unit area, and hence reduces density of rays on the discharge surface 2a. Consequently, there does not appear bright lines.

Figure 6:
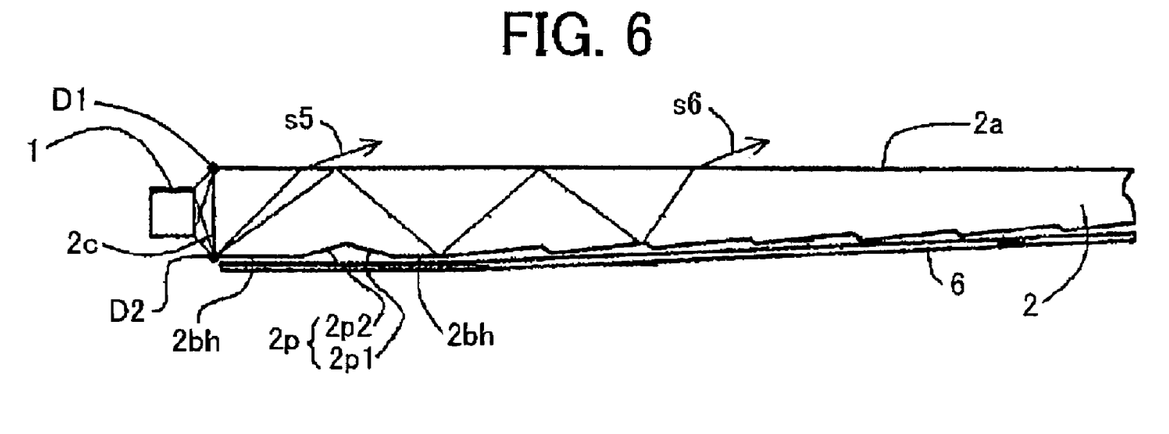
FIG. 6 shows optical paths of rays from the lower corner D2.

FIG. 6 shows optical paths of rays from the lower corner D2. Light s5 discharges from the discharge surface 2a because of a small incident angle. The incident angle of light s6 is larger than the critical angle, so that the light is reflected four times before discharging. In such a case, there appears bright lines.

Figure 4D:
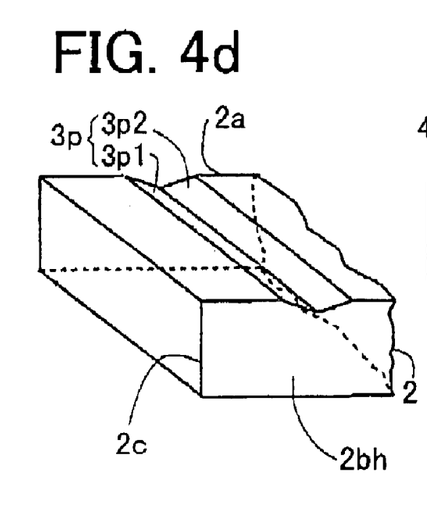
Figure 7:
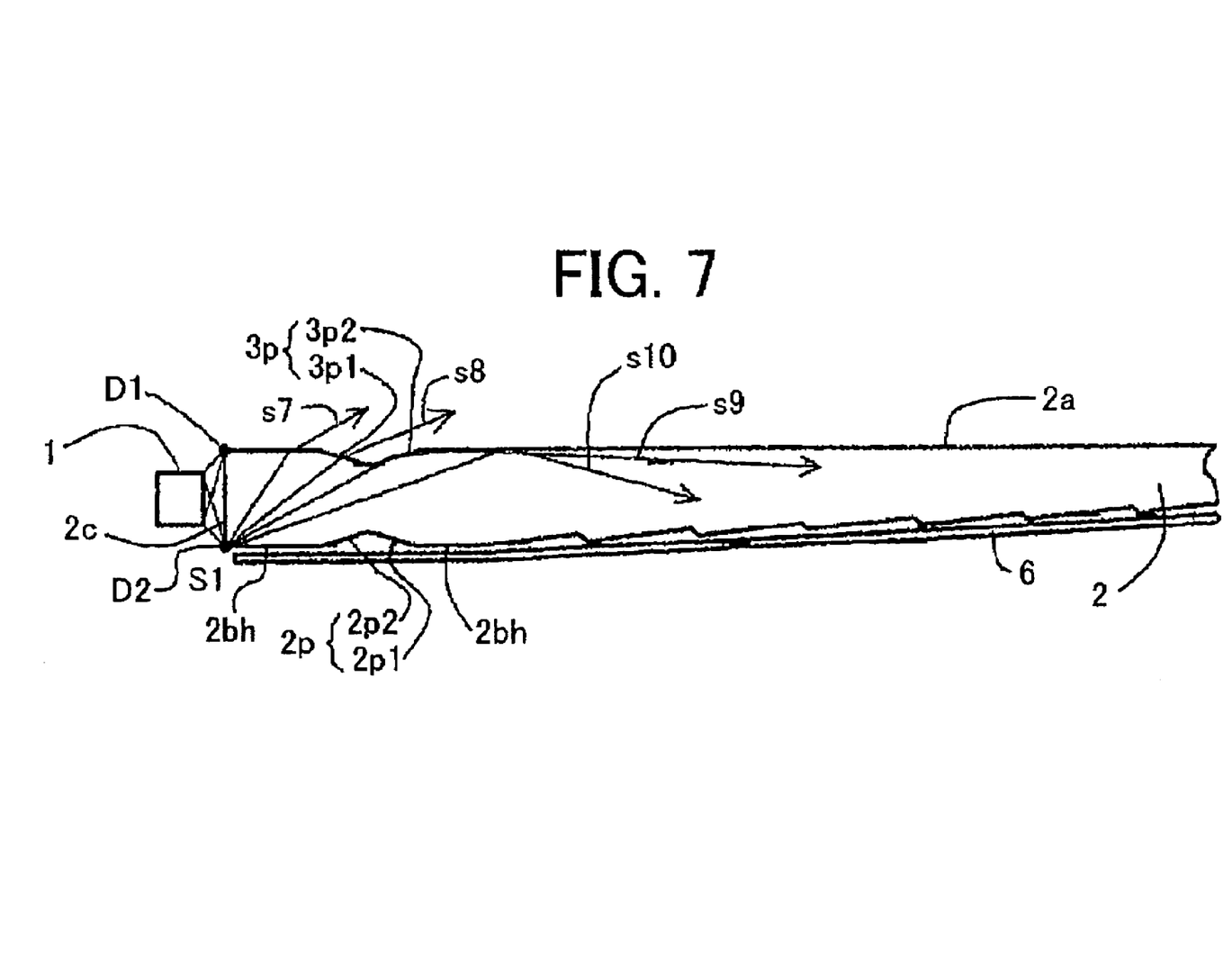
FIG. 7 is a side view of a second embodiment of the present invention.

FIG. 7 is a side view of a second embodiment of the present invention. The second embodiment is provided for preventing the generation of bright lines caused by rays from the lower corner D2. As shown in FIG. 7, an equilateral prism 3p, which is shown in FIG. 4d, comprising first and second inclination sides 3p1, 3p2 is formed on the discharge side 2a at a position near the incident surface 2c.

The light from the lower corner D2, which strikes an area on the left side of the first inclination side 3p1, discharges from the discharge surface 2a because of a small incident angle, as light s7.

Figure 9:
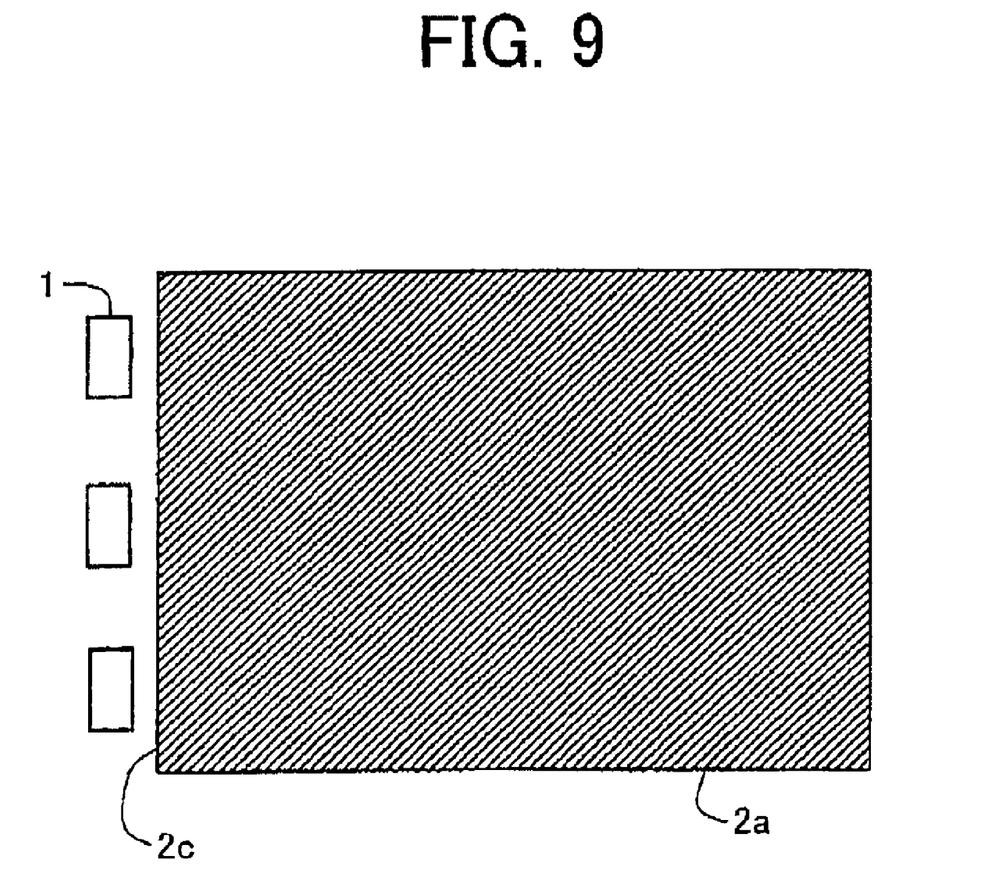
FIG. 9 is a plan view of the lighting panel.

Next, the incident light to the first inclination side 3p1 discharges from the side, since the incident angle thereof is small because of the inclination of the side, as light s8. The incident angle of the light striking the second inclination side 3p2 is very large. Therefore, the light does not discharge from the discharge surface 2a, as light s9. The light s10 striking the discharge surface 2a repeats reflection because of a large incident angle, thereby increasing the width of the discharged light. Consequently, bright lines do not generate. Thus, the light uniformly discharges from the discharge surface 2a as shown in FIG. 9.

Figure 4E:
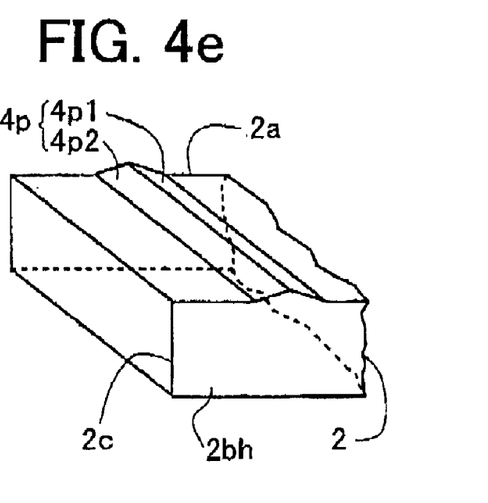
Figure 8:
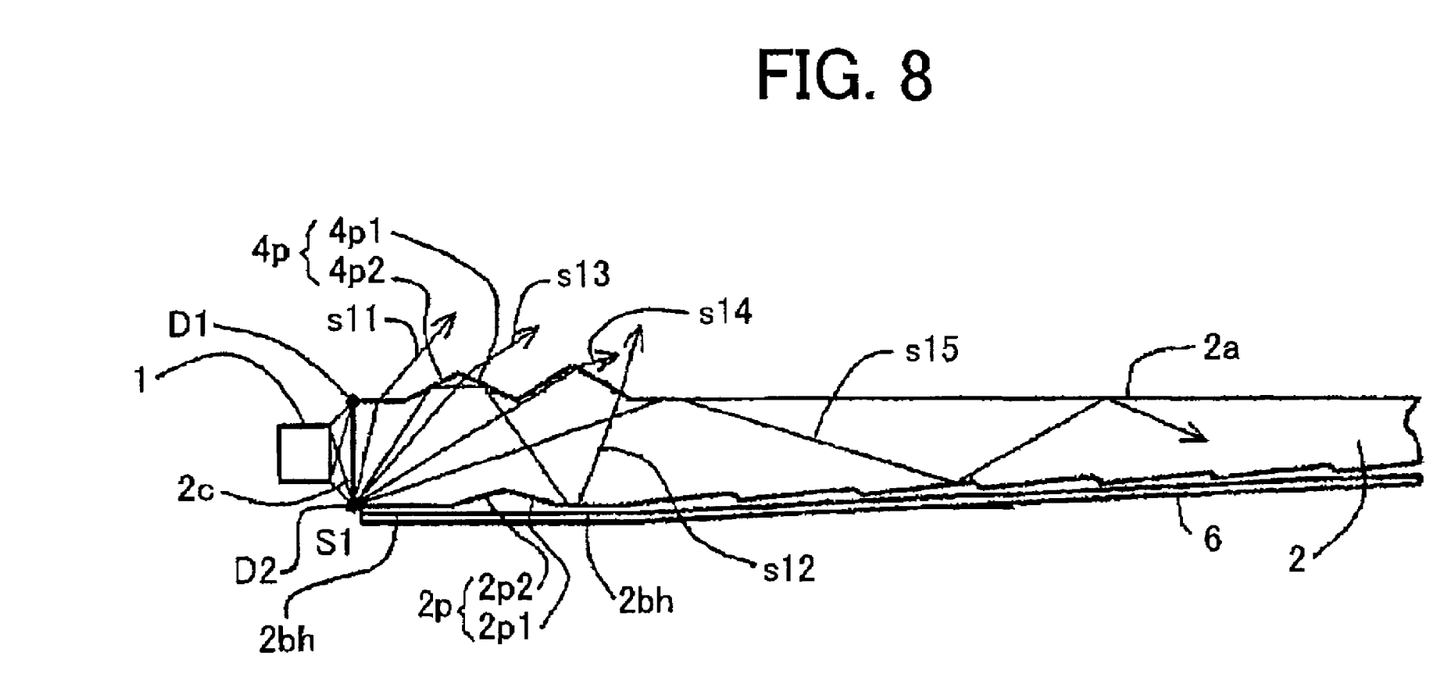
FIG. 8 is a side view of a third embodiment of the present invention.

FIG. 8 is a side view of a third embodiment of the present invention. There is formed two equilateral prisms 4p on the discharge surface 2a, upwardly projected. The equilateral prism 4p is shown in FIG. 4e. The light s11 striking the left side surface 2a of the equilateral prism 4p, discharges from the discharge surface 2a because of a small incident angle.

The incident light s12 to the second inclination side 4p2 is reflected on the side on the first side 4p1 and on the reflection surface 2b and discharges from the discharge surface 2a. The incident angle of the light s13 striking the first inclination side 4p1 is small. Therefore, the light discharges from the discharge surface 2a. Also light s14 discharges from the discharge surface 2a. The light s15 striking the discharge surface 2a repeats reflection because of a large incident angle, thereby increasing the width of the discharged light. Consequently, bright lines do not generate. Thus, the light uniformly discharges from the discharge surface 2a as shown in FIG. 9.

In accordance with the present invention, light lines can be prevented from appearing by the prism provided on a flat plane formed adjacent the incident surface of the lighting panel.

While the invention has been described in conjunction with preferred specific embodiment thereof, it will be understood that this description is intended to illustrate and not limit the scope of the invention, which is defined by the following claims.

What is claimed is:

1. A panel for lighting a display comprising:

a lighting panel made of a transparent plastic and having a rectangular shape in plan view;

the lighting panel having a reflection surface and a discharge surface on opposite long sides and an incident surface on a short side of the lighting panel;

an edge light provided corresponding to the incident surface;

a plurality of scalene prisms formed on the reflection surface of the lighting panel;

a flat plane formed on the reflection surface in a range between the incident surface and a group of the scalene prisms; and at least one first equilateral prism formed on the flat plane.

2. The panel according to claim 1 further comprising at least one second equilateral prism formed on the discharge surface adjacent the incident surface.

3. The panel according to claim 2 wherein each of the first and second equilateral prisms is formed into a form projected inside the panel.

4. The panel according to claim 2 wherein each of the first and second equilateral prisms is formed into a form outwardly projected from the panel.

* * * * *